R. A. MAINGAY.
FILTER AND PURIFIER.
No. 24,036. Patented May 17, 1859.
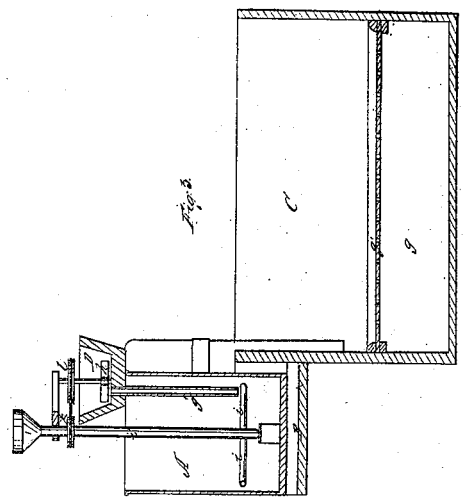
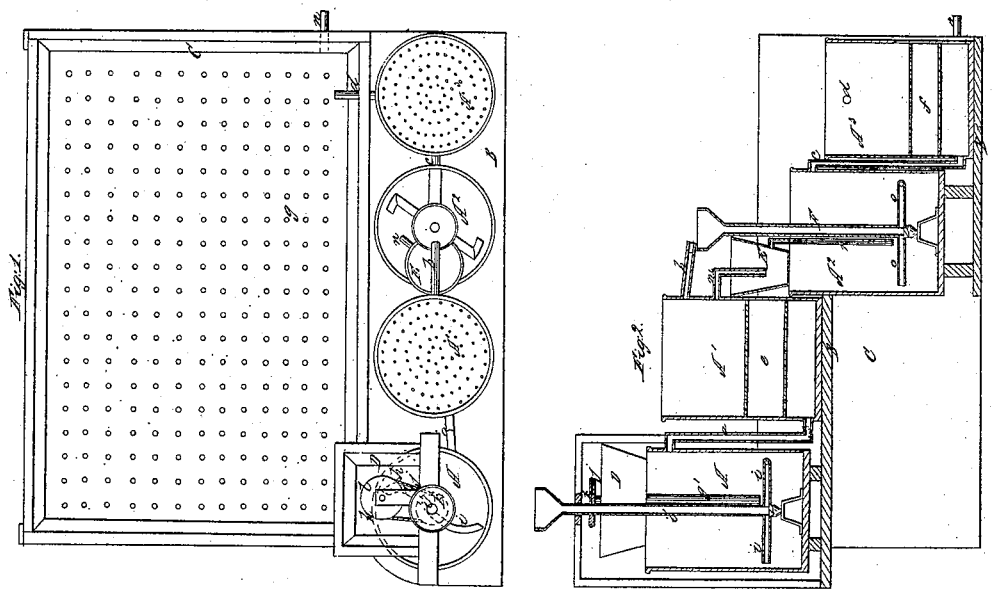

UNITED STATES PATENT OFFICE.

ROBERT A. MAINGAY, OF POTTSVILLE, PENNSYLVANIA.

FILTER AND PURIFIER.

Specification of Letters Patent No. 24,036, dated May 17, 1859.

*To all whom it may concern:*

Be it known that I, R. A. MAINGAY, of Pottsville, in the county of Schuylkill and State of Pennsylvania, have invented a new and useful Improvement in Apparatus for Purifying and Filtering Mine and Mineral Waters; and I do hereby declare that the following is a full, clear, and exact description of the same, reference being had to the accompanying drawings, forming a part of this specification, in which—

Figure 1, is a plan or top view of my apparatus. Fig. 2, is a vertical longitudinal section of the same, and Fig. 3, is a vertical transverse section of the same.

Similar letters of reference, in each of the several figures, indicate corresponding parts.

The mine waters of coal regions are found by analyzation to be strongly impregnated with carbonic acid, sulfuric acid, large quantities of alum and sulfate of iron. These properties as it may be well known, render it very destructive to steam boilers and other apparatuses used about mines.

The object of my invention is to deprive the water of these destructive properties and at the same time filter, so that it will be useful for mechanical and domestic purposes.

The nature of my invention consists in a peculiar arrangement of a series of purifying and filtering hogsheads, a large filtering tank or reservoir, a series of purifier kegs or hoppers and a series of turbines whereby the above named results may be accomplished in a speedy, perfect and economical manner, as will be presently described.

To enable others, skilled in the art, to make and use my invention, I will proceed to describe its construction and operation.

In carrying out my invention, I employ a series of hogsheads A, $A^1$, $A^2$, $A^3$, arranged contiguously to each other at different elevations on a platform B, which is constructed somewhat after the manner of stairs. These hogsheads I have to communicate with each other by means of pipes $a$, $b$, $c$. To one side of the hogsheads I arrange a large tank or reservoir C, which I have to communicate by means of a pipe $d$, with the last one of the tier of hogsheads, as shown. Two of these hogsheads $A^2$, $A^3$, and the tank C, are constructed as shown at $e$, $f$, $g$, to contain suitable purifiers and filtering materials, such as horse dung and gravel, &c., and the other two I make serve as agitating or mixing chambers.

In connection with the above I employ the following devices. Above the first hogshead, I arrange a lime water hopper D, which is made to communicate with the interior of the same by a vertical pipe $g^1$. In this hopper, on a vertical shaft, is placed a revolving agitator $h$. This agitator, I combine with a vertical hollow tube $i^2$, which passes down into the hogshead, and rests in a cone step arranged in the bottom of the same. This tube has two curved hollow branch tubes $i$, $i$, projecting laterally out from it, which operate on the principle of the ordinary turbine. The combination between the agitator is effected by means of a band $j$, and pulley $l$, on the shaft of the agitator and a pulley $k$, on the hollow shaft of the turbine $i$, $i$, as shown. Above the third hogshead $A^2$, I arrange an alkali (soda) keg E, and have the same communicate with the second hogshead $A'$, by a pipe $m$, and with the 3rd hogshead $A^2$, by a pipe $n$. We also arrange in the center of the hogshead $A^2$, a hollow shaft F, with turbine arms $o$, $o$, similar to the one arranged in the hogshead A, as shown.

Operation: The water to be purified and filtered enters the enlarged upper end of the hollow tube $i^1$ of the turbine, of hogshead A, and by its weight in descending through the tube and turbine sets the turbine $i$, $i$, in rapid motion, and thereby causes the agitator $h$ to revolve and stir up the lime water in the hopper D. The communication between the hopper and the hogshead A, being open the lime water descends and mixes with the agitated water in the hogshead A, and deprives it of an excess of carbonic acid, and falls to the bottom of the hogshead, the union having formed a carbonate of lime. The water while undergoing this chemical change rises to the top of the hogshead and flows into the hogshead $A'$, through the pipe $a$, and rises through a purifying medium $e$ formed of a layer of coarse gravel, a layer of fine gravel and a layer of horse dung, and is thus deprived of some of its impurities, and especially of a greater portion of the alum which it contains, the ammonia of the horse dung effecting this. The water having risen to the top of the hogshead $A^1$, it flows into the hogshead $A^2$, by means of the pipe $b$, and the turbine F, $o$, $o$, which latter is caused to revolve, as the water passes through it, and keep the water in motion. At the same time that a greater portion of the water is passing down through the turbine a minor quantity is flowing into the alkali (soda or borax) keg through the pipe $m$, from the hogshead A', and mixing the alkali and causing the same to flow into the hogshead $A^2$, through the pipe $n$, and thoroughly commingle with the agitated water therein and deprive it of its sulfuric acid and sulfate of iron, and also soften it. The water having risen to the top of the hogshead $A^2$, flows into the hogshead $A^3$, at the bottom, by means of the pipe $c$, and rises through a filtering medium $f$, of gravel and horse dung, and is here further deprived of its impurities, and especially of any alum which it may still hold. From this hogshead, it passes into the tank or reservoir, through the pipe $d$ and descends through a filtering medium $g$, formed of a layer of coarse gravel, a layer of fine gravel, a layer of sand, a layer of charcoal, and then a finishing layer of very fine sand. The water, having experienced the several chemical changes and mechanical operations specified, it will be found on being drawn off through the pipe $n$, almost perfectly free from any properties which are destructive to boilers or other apparatus used about mines, and which render it useless for domestic purposes.

What I claim as my invention and desire to secure by Letters Patent, is—

1. The combination of the lime water hopper D agitator $h$ turbine $i^1$, $i$, $i$, and hogshead A, substantially as and for the purposes set forth.

2. The combination of the alkali keg E, hogsheads A', $A^2$, and turbine F, $o$, $o$, substantially as and for the purposes set forth.

3. The arrangement and combination of the purifying and filtering hogsheads A, A', $A^2$, $A^3$, filtering tank C, turbines F, $o$, $o$, $i^1$, $i$, $i$, purifier and alkali kegs or hoppers D, E, substantially as and for the purposes set forth.

The above specification of my improvement in purifiers and filterers signed by me this 24th day of March, 1859.

ROBT. A. MAINGAY.

Witnesses:
G. YORKE ATLEE,
H. H. YOUNG.